June 14, 1932.  G. C. FOLBERTH  1,863,441
NOVELTY JUMPING ACCESSORY FOR SLEDS OR THE LIKE
Filed May 3, 1930  2 Sheets-Sheet 1
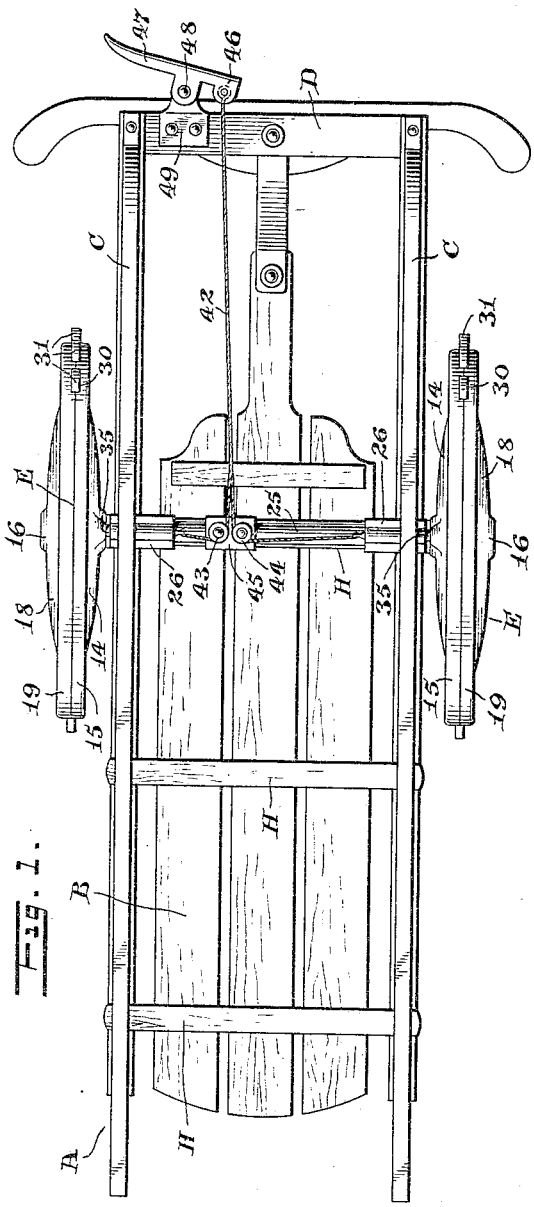
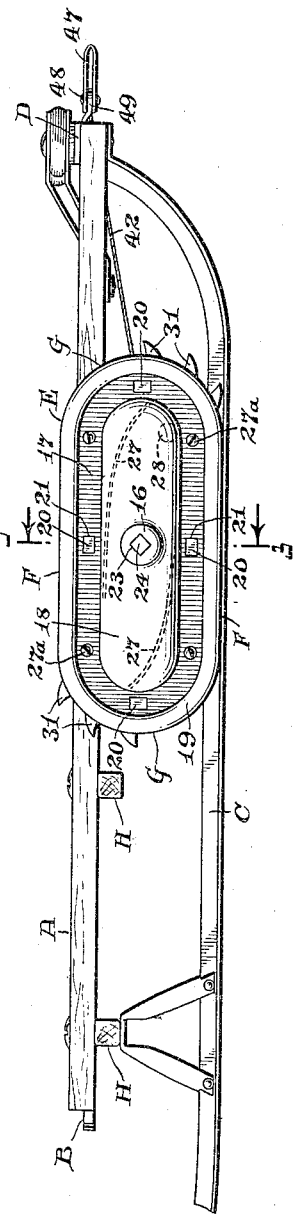
INVENTOR
Gustav C. Folberth
BY
Munn & Co.
ATTORNEYS June 14, 1932. G. C. FOLBERTH 1,863,441
NOVELTY JUMPING ACCESSORY FOR SLEDS OR THE LIKE
Filed May 3, 1930 2 Sheets-Sheet 2
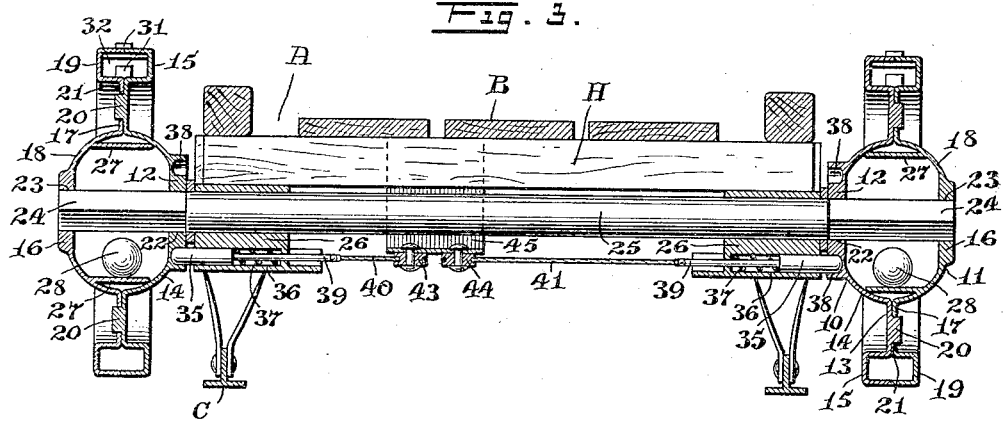
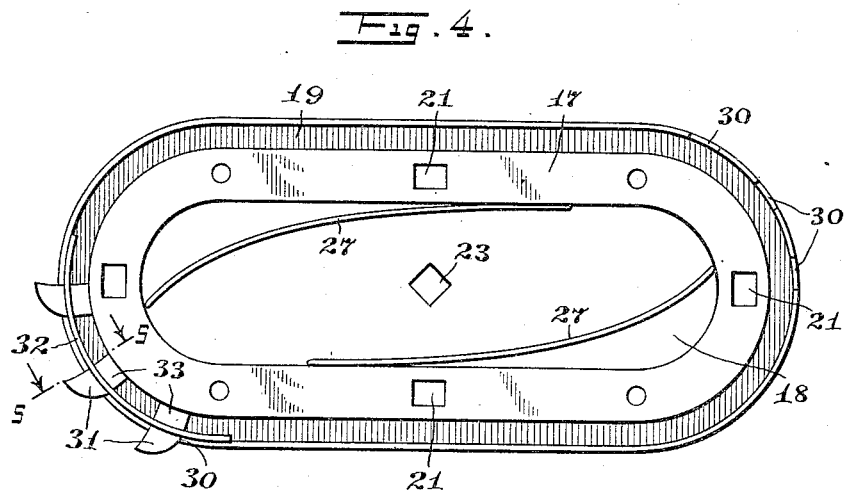
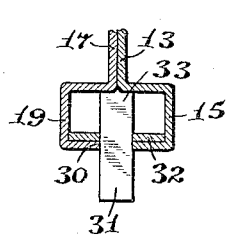
INVENTOR
Gustav C. Folberth
BY Munn & Co.
ATTORNEYS Patented June 14, 1932

1,863,441

UNITED STATES PATENT OFFICE

GUSTAV C. FOLBERTH, OF NEW YORK, N. Y.

NOVELTY JUMPING ACCESSORY FOR SLEDS OR THE LIKE

Application filed May 3, 1930. Serial No. 449,623.

This invention relates to a device in the nature of an accessory for sleds or other equivalent vehicles, for imparting thereto a novel action, and refers more particularly to a device of this character by virtue of which a sled or the like will be, when desired, caused to jump or leap from its supporting surface, for the purpose of further adding to the amusement and pleasure of the rider.

The invention further aims to provide a jumping accessory for sleds or equivalent vehicles, which is so mounted and actuated as to be under the direct control of a rider, whereby the device may be brought into active use or rendered inactive at the will of the rider.

More specifically, the invention comprehends an accessory of the character set forth, in which use is preferably made of a pair of rotary elements mounted to turn in a vertical plane on a horizontal axis and each having a major and a minor diameter, whereby in coasting down a hill, the periphery of the element at the major diameter will tend to lift the sled runners out of contact with the snow and cause the sled in effect to leap or jump for a considerable distance.

The invention further aims in a device or accessory of the character set forth, to provide elements as previously specified, in which the minor diameter presents surfaces which are above the lower surfaces of the runners, whereby with the device in an inactive position, the sled may be used in the ordinary manner.

The invention further embodies means under the control of a rider which normally functions to hold the jump or leap producing elements in their inactive position, and which means may be released at the will of the rider to permit the device to function.

The invention further includes means for effecting the initial movement of the jump or leap producing elements when released, to cause the same to contact with the snow or surface for causing the same to be rotated by virtue of the forward movement of the sled, whereby to accomplish their function.

Other objects of the invention reside in the comparative simplicity of construction of the accessory, the economy with which it may be produced and installed on a sled or other equivalent vehicle and the highly amusing and attractive action which results from the use of the same.

With the above recited and other objects in view, reference is had to the following description and accompanying drawings, in which there is exhibited one example or embodiment of the invention, while the claims define the actual scope of the same.

In the drawings:

Figure 1 is a bottom plan view of a sled equipped with a jumping accessory constructed in accordance with the invention, and illustrating the same locked in its normal inactive condition.

Figure 2 is a side view thereof.

Fgure 3 is an enlarged transverse sectional view therethrough taken approximately on the line indicated at 3—3 in Figure 2.

Figure 4 is an enlarged side view of one of the jump or leap producing elements with the outermost section thereof removed.

Figure 5 is a detail fragmentary transverse sectional view taken approximately on the line indicated at 5—5 of Figure 4.

Referring to the drawings by characters of reference, A designates generally a sled which includes the usual deck or body B having laterally spaced depending runners C, and which sled is further provided with the transverse cross bars D connected to the forward end of the runners.

The accessory constituting the subject matter of the present invention, which is especially designed for use in connection with sleds although not necessarily restricted to such use, broadly includes preferably a pair of rotary elements designated generally by the reference character E, which elements are mounted on the sled to turn in a vertical plane on a horizontal axis. The elements E have a major and a minor diameter, and the latter minor diameter presents diametrically opposite surfaces F, which surfaces F, due to the mounting of the elements E, are disposed above the lower surfaces of the runners C in a normal inactive position of the accessory. The configuration of the elements E further presents diametrically opposed rounded end surfaces G, which are adapted upon turning or rotation of the elements E, to extend below the lower surfaces of the runners C for lifting the runners out of contact with the snow and causing the sled in effect to jump or leap for a considerable distance, especially when coasting down a hill.

In order to demonstrate one practical embodiment of the invention, the elements E are disclosed as comprising a pair of sections 10 and 11, the former being hereinafter referred to as the inner section and the latter as the outer section. The inner section 10, which may be produced in any suitable manner, such as by casting, pressing or otherwise forming the same, comprises a hub portion 12, a web portion 13 joined to the hub portion 12 by a concavo-convex portion 14 and a substantially channel shaped rim portion 15 at the outer marginal edge of the web portion 13. The outer section 11 is of substantially the same shape, including a hub portion 16, a mating web portion 17, a substantially concavo-convex portion 18 joining the web portion to the hub portion and a mating channel shaped rim portion 19 at the outer marginal edge of the web portion 17. The web portion 13 of the inner section is provided with a plurality of lateral outwardly projecting studs 20, and the web portion 17 of the outer section is formed with correspondingly shaped apertures 21 receiving the studs 20. The hub portion 12 of the inner section 10 is formed with a non-circular opening 22, and the hub portion 16 of the outer section 11 is formed with an aligned correspondingly shaped opening 23, which combined openings are designed to receive the non-circular extremity 24 of a shaft 25. The shaft 25 is arranged transversely under the deck or body portion B of the sled at a point intermediate the length of the sled, and said shaft is journaled for rotation in bearings 26 which are suitably secured to one of the cross beams H of the deck structure. The sections 10 and 11 of the elements E are secured together against separation by bolts, rivets or other equivalent securing means 27a, and the concavo-convex portion 18 of the outer section 11 of each element E is formed with inwardly projecting flanges 27 which combine with the hub portions 22 and 16 of the several sections and the concavo-convex portions 14 and 18, as well as the hub portions 12 and 16, to define a guideway for a weight 28, preferably in the form of a ball, the purpose of which will hereinafter appear. It will be further observed that the flanges 27 incline or curve upwardly from one end to the opposite end, and the function of this will be further set forth. The mating free edges of the channel shaped rim portions 15 and 19 at diametrically opposite points of each element E are provided with registering notches 30, and said notches combine to form apertures for receiving therethrough the teeth 31 which project through the notches and beyond the rounded end surfaces G of the elements E, said teeth also extending through an arcuate or curved spacing strip 32 which is disposed within the channel shaped rim portions 15 and 19 of the sections 10 and 11. The rear ends 33 of the teeth abut against the innermost portions of the channel shaped rims 15 and 19, as clearly illustrated in Figures 4 and 5 of the drawings.

From the foregoing construction, it will be observed that the sled is provided with an accessory including a pair of rotary elements secured to a shaft journaled for rotation, the rotary elements being disposed on opposite sides of the sled, whereby in coasting down a hill the rounded end peripheries G of the elements E turning in a vertical plane on a horizontal axis will tend to lift the sled runners intermittently out of contact with the snow for causing the sled in effect to leap or jump for a considerable distance.

In order to provide means for placing the accessory under the direct control of a rider whereby the device may be brought into active use or rendered inactive at the will of the rider, a detent or latch 35 is employed for each of the rotary elements E, and said detent or latch 35 is preferably mounted for lateral sliding movement in a bore 36 formed in the bearing 26, a spring 37 being employed to normally urge the latch or detent 35 outwardly and into one or the other of a pair of keeper recesses 38 formed in the hub portion 12 of the inner section 10 of the element E. The keeper recesses 38 are formed at diametrically opposite points on the hub and in a position where, when the detent or latch 35 engages within either of said recesses, the major diameter of the element E will be disposed horizontally, whereby the surfaces F of the elements B will be disposed above the lower surfaces of the runners C. In order to manually retract the detents or latches 35 from the keeper recesses 38, the inwardly projecting latch or detent stems 39 are connected to the branch leads 40 and 41 of a cable or flexible element 42, the leads 40 and 41 being trained around sheaves or guides 43 and 44 journaled on a bracket 45 which is carried by the cross beam H or any other suitable support. The flexible element or cable 42 leads forwardly and is connected to one extremity 46 of a manipulating lever 47 which is fulcrumed as at 48 to a bracket 49 attached to the cross bar D.

In use and operation, the springs 37 normally function to urge the latches or detents 35 into one or the other of the keeper recesses 38 in the hubs 12 of the inner sections 10 of the elements E, thereby locking the rotary elements E in their inactive position so that the sled may be used in the ordinary manner. Assuming the elements E to be in this normal inactive position and with the sled in motion, such as, for instance, coasting down a hill or grade, the rider may render the accessory active by manipulating the lever 47 to swing the extremity 46 forwardly, thereby exerting a pull on the cable or flexible element 42 to retract the latches or detents 35. As soon as the latches are released, the weight or ball 28, which will be in the dotted line position illustrated in Figure 2 of the drawings, namely, forward of the axis of rotation of the elements E, will serve to over-balance the forward ends of said elements E and initially gravitationally move said forward ends downwardly until the teeth 31 engage or bite in the snow or surface over which the sled is moving. Obviously, this will cause the elements E to rotate in a vertical plane so that the major diameter and the rounded ends G elevate or lift the sled from the surface over which it is traveling and, in effect, will cause said sled to leap or jump over the surface, which, due to the forward motion or momentum, will carry the same a considerable distance before the trajectory of the lower surfaces of the runners C again coincides with the surface over which the sled is traveling. Due to the forward motion and momentum combined with the descent of the sled, very little, if any, shock will be transmitted to the rider. If the latches are held in their retracted and released positions, it is apparent that the sled will be caused to execute a series of intermittent jumps or leaps as previously described, whereas release of the manipulating lever 47 will at the option of the rider permit the re-engagement of the latches in the keeper recesses 38 to render the accessory inactive.

While there has been illustrated and described one embodiment of the invention, it is to be clearly understood that no restriction or limitation is intended as to the precise details of construction herein exhibited, but that variations and modifications which properly fall within the scope of the appended claims may be resorted to when desired.

What is claimed is:

1. In an accessory for a sled for elevating the same during translatory movement thereof over a supporting surface, an element mounted for rotation on a horizontal axis, said element having a surface eccentric to its axis for intermittent contact with the supporting surface when rotating, and releasable means for holding said element against rotation in an inactive position.

2. In an accessory for a sled for elevating the same during translatory movement thereof over a supporting surface, an element having a minor and a major diameter, mounted for rotation on a concentric horizontal axis for intermittent contact with the supporting surface when rotating and releasable means for retaining said element against rotation in an inactive position with its major diameter disposed horizontally.

3. In an accessory for a sled for elevating the same during translatory movement thereof over a supporting surface, an element having a minor and a major diameter, mounted for rotation on a concentric horizontal axis for intermittent contact with the supporting surface when rotating and releasable means for retaining said element against rotation in an inactive position with its major diameter disposed parallel to the length of the sled.

4. In an accessory for a sled for elevating the same during translatory movement thereof over a supporting surface, an element having a minor and a major diameter, mounted for rotation on a concentric horizontal axis for intermittent contact with the supporting surface when rotating, releasable means for retaining said element against rotation in an inactive position with its major diameter disposed horizontally and traction means at the ends of said element which define the major diameter adapted to coact with the supporting surface to insure turning movement of the element coincident with the translatory movement of the sled.

5. In an accessory for a sled for elevating the same during translatory movement thereof over a supporting surface, an element having a minor and a major diameter, mounted for rotation on a concentric horizontal axis, releasable means for retaining said element in an inactive position with its major diameter disposed horizontally, traction means at the ends of said element which define the major diameter adapted to coact with the supporting surface to insure turning movement of the element coincident with the translatory movement of the sled and means for overbalancing a predetermined end of the element to cause initial contact of said end with the supporting surface.

6. In an accessory for a sled for elevating the same during translatory movement thereof over a supporting surface, an element having a minor and a major diameter, mounted for rotation on a concentric horizontal axis, releasable means for retaining said element in an inactive position with its major diameter disposed horizontally, traction means at the ends of said element which define the major diameter adapted to coact with the supporting surface to insure turning movement of the element coincident with the translatory movement of the sled and means for overbalancing the foremost end of the element to cause initial contact of said end with the supporting surface.

7. In an accessory for a sled for elevating the same during translatory movement thereof over a supporting surface, an element having a minor and a major diameter, mounted for rotation on a concentric horizontal axis, releasable means for retaining said element in an inactive position with its major diameter disposed horizontally, traction means at the ends of said element which define the major diameter adapted to coact with the supporting surface to insure turning movement of the element coincident with the translatory movement of the sled and means for overbalancing a predetermined end of the element to cause initial contact of said end with the supporting surface, said means consisting of a movable weight carried by said element.

8. In an accessory for a sled for elevating the same during translatory movement thereof over a supporting surface, an element having a minor and a major diameter, mounted for rotation on a concentric horizontal axis, releasable means for retaining said element in an inactive position with its major diameter disposed horizontally, traction means at the ends of said element which define the major diameter adapted to coact with the supporting surface to insure turning movement of the element coincident with the translatory movement of the sled, means for over-balancing a predetermined end of the element to cause initial contact of said end with the supporting surface, said means consisting of a movable weight carried by said element and guide means for causing the weight to gravitate toward said predetermined end.

9. In an accessory for a sled for elevating the same during translatory movement thereof over a supporting surface, an element having a minor and a major diameter, mounted for rotation on a concentric horizontal axis, releasable means for retaining said element in an inactive position with its major diameter disposed horizontally, traction means at the ends of said element which define the major diameter adapted to coact with the supporting surface to insure turning movement of the element coincident with the translatory movement of the sled and means for over-balancing the foremost end of the element to cause initial contact of said end with the supporting surface, said means consisting of a movable weight carried by the member and guide means for causing the weight to gravitate toward the foremost end of said element.

10. A device for use in conjunction with a sled for the purpose of continually elevating the sled during translatory movement of the same over a supporting surface, comprising a weighted elongated member and means for mounting said member on a sled for rotation on a horizontal axis to intermittently contact with the supporting surface while rotating and means for releasably retaining said member in an inactive position.

11. An accessory for sleds for elevating the same during translatory movement thereof over a supporting surface including a transverse horizontal shaft journaled on the sled for rotation, a pair of elements each having a minor and major diameter secured concentrically to the opposite ends of said shaft for rotation therewith in a vertical plane, the major diameter of said elements when rotating adapted for intermittent contact with the supporting surface, traction means at the ends of said elements which define the major diameter adapted to coact with the supporting surface to insure turning movement of the elements coincident with the translatory movement of the sled and releasable means for retaining said elements in an inactive position with the major diameter disposed horizontally.

12. An accessory for sleds for elevating the same during translatory movement thereof over a supporting surface including a transverse horizontal shaft journaled on the sled for rotation, elements concentrically keyed to the opposite ends of said shaft for rotation therewith in a vertical plane, said elements each having a minor and a major diameter, traction means at the ends of said elements which define the major diameter adapted to coact with the supporting surface to insure turning movement of the elements coincident with the translatory movement of the sled, releasable means for retaining said elements in an inactive position with the major diameter disposed horizontally and means for over-balancing the forward ends of said elements when released by said retaining means whereby to cause initial contact of said forward ends with the supporting surface.

13. An accessory for sleds for elevating the same during translatory movement thereof over a supporting surface including a transverse horizontal shaft journaled on the sled for rotation, elements concentrically keyed to the opposite ends of said shaft for rotation therewith in a vertical plane, said elements each having a minor and a major diameter, traction means at the ends of said elements which define the major diameter adapted to coact with the supporting surface to insure turning movement of the elements coincident with the translatory movement of the sled, releasable means for retaining said elements in an inactive position with the major diameter disposed horizontally and means for over-balancing the forward ends of said elements when released by said retaining means whereby to cause initial contact of said forward ends with the supporting surface, said over-balancing means consisting of a spherical weight and means defining a guideway within the elements for causing said weights to gravitate toward the forward ends of said elements.

GUSTAV C. FOLBERTH.